(12) United States Patent
Hiltner

(10) Patent No.: US 6,557,528 B2
(45) Date of Patent: May 6, 2003

(54) METHOD OF CONTROLLING DETONATION IN AN INTERNAL COMBUSTION ENGINE

(75) Inventor: Joel D. Hiltner, Powell, OH (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 09/943,197

(22) Filed: Aug. 30, 2001

(65) Prior Publication Data

US 2003/0041840 A1 Mar. 6, 2003

(51) Int. Cl.⁷ ............................. G01L 23/22; F02P 5/10
(52) U.S. Cl. .............. 123/406.42; 123/435; 123/406.47; 123/406.43; 701/105; 701/111; 73/35.12
(58) Field of Search ...................... 123/406.41, 406.42, 123/435, 406.43, 406.47; 701/105, 111; 73/35.12

(56) References Cited

U.S. PATENT DOCUMENTS

| | | | |
|---|---|---|---|
| 4,063,538 A | | 12/1977 | Powell et al. ............ 123/117 R |
| 4,285,315 A | * | 8/1981 | Douaud et al. ......... 123/406.42 |
| 4,391,248 A | * | 7/1983 | Latsch ......................... 123/435 |
| 4,620,438 A | | 11/1986 | Howng .......................... 73/35 |
| 4,718,382 A | * | 1/1988 | Tanaka ................... 123/406.22 |
| 4,736,620 A | * | 4/1988 | Adolph ...................... 73/35.12 |
| 4,736,724 A | | 4/1988 | Hamburg et al. ........... 123/435 |
| 4,745,902 A | * | 5/1988 | Yagi et al. ............. 123/406.42 |
| 4,802,454 A | * | 2/1989 | Tanaka ................... 123/406.42 |
| 5,038,744 A | | 8/1991 | Martin et al. ............... 123/625 |
| 5,168,854 A | | 12/1992 | Hashimoto et al. ......... 123/425 |
| 5,219,227 A | | 6/1993 | Yang et al. ................. 374/143 |
| 5,276,625 A | | 1/1994 | Nakaniwa .............. 364/431.08 |
| 5,359,883 A | | 11/1994 | Baldwin et al. ........... 73/117.3 |
| 5,452,087 A | | 9/1995 | Taylor et al. ............... 356/352 |
| 5,560,326 A | | 10/1996 | Merritt ................... 123/51 AA |
| 5,714,680 A | | 2/1998 | Taylor et al. .................. 73/37 |
| 6,073,440 A | | 6/2000 | Douta et al. .................. 60/277 |
| 6,272,426 B1 | * | 8/2001 | Tascillo ................. 123/406.42 |

\* cited by examiner

Primary Examiner—Erick Solis
(74) Attorney, Agent, or Firm—Todd T Taylor

(57) ABSTRACT

A method of controlling detonation in an internal combustion engine is provided with the steps of: combusting a fuel and air mixture within a combustion cylinder; sensing a plurality of pressures at discrete points in time within the combustion cylinder; determining a pressure profile of the plurality of pressures; detecting detonation within the combustion cylinder; and acting upon the detonation, dependent upon where said detonation occurs on the pressure profile.

14 Claims, 3 Drawing Sheets

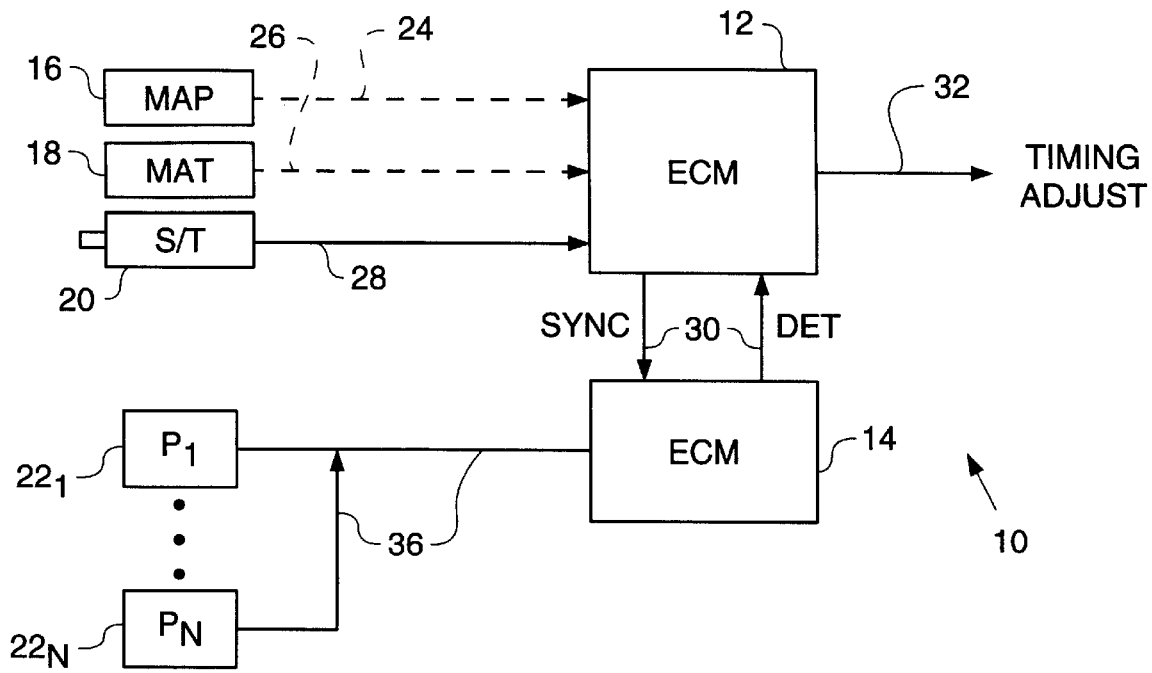
Fig_1_
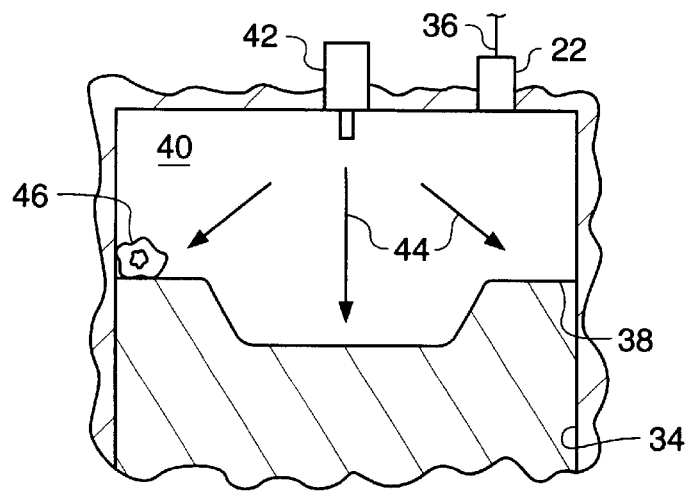
Fig_2_

Fig-3-
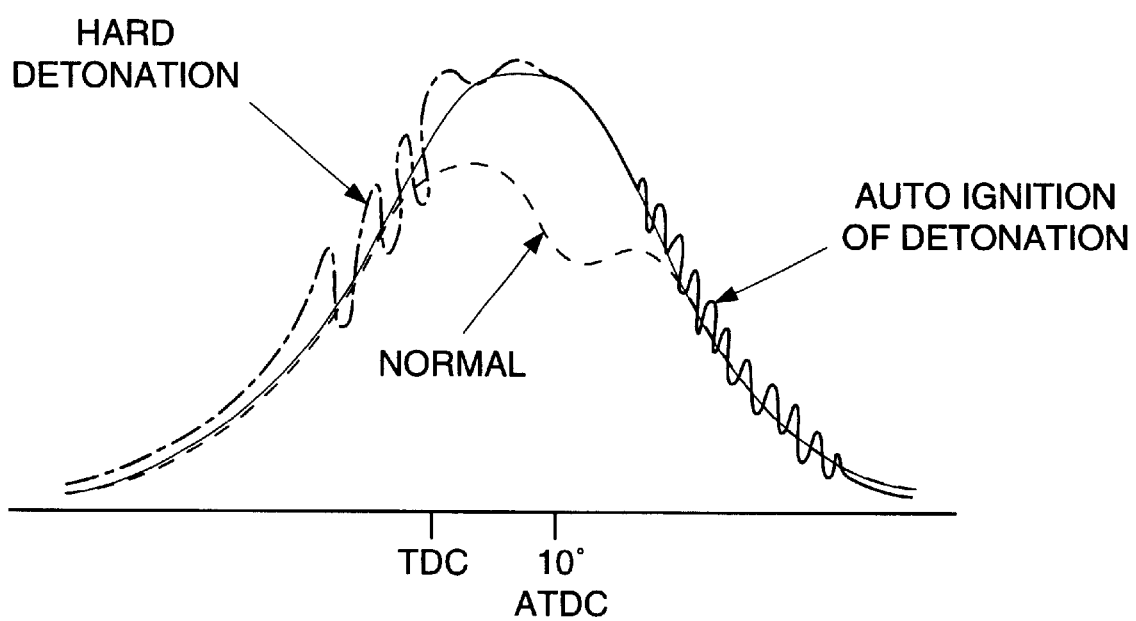

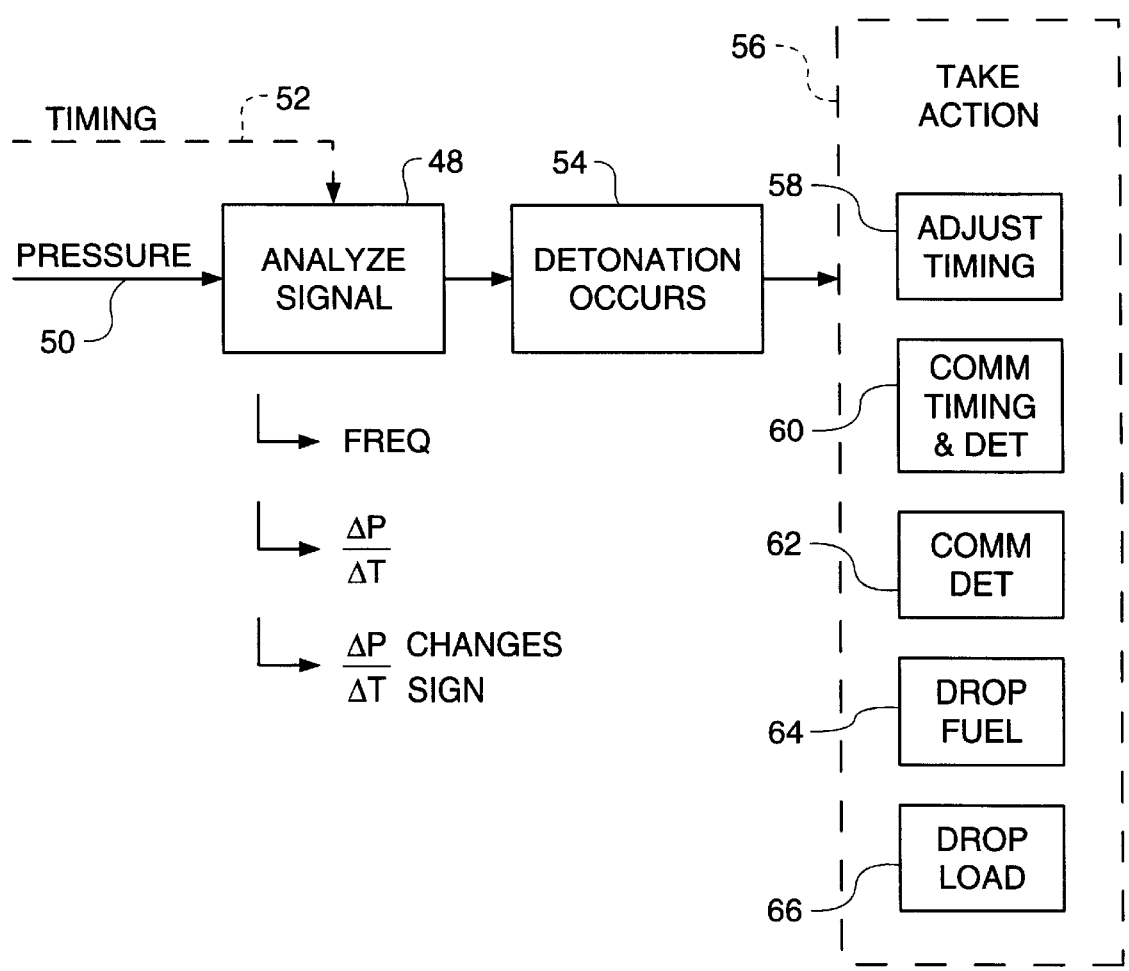

METHOD OF CONTROLLING DETONATION IN AN INTERNAL COMBUSTION ENGINE

TECHNICAL FIELD

The present invention relates to internal combustion engines, and, more particularly, to a method of controlling detonation in internal combustion engines.

BACKGROUND

An internal combustion engine generally is of two basic types, i.e., a spark ignition engine and a compression combustion engine. A spark ignition engine uses a spark plug to ignite the fuel and air mixture which is injected into the combustion chamber. A compression combustion engine utilizes the energy resulting from compression of the fuel and air mixture as the piston travels towards a top dead center position within the combustion cylinder to ignite the fuel and air mixture. Regardless of whether the internal combustion engine is a spark ignition engine or a compression combustion engine, it is desirable to control the point in time at which combustion occurs relative to the position of the piston within the combustion cylinder.

It is known to provide a plurality of pressure sensors which sense pressures within respective combustion cylinders at discrete points in time. Signals from the pressure sensors may be transmitted to an Electronic Control Module (ECM) for the purpose of controlling the timing of the combustion event within the combustion cylinder as the piston reciprocates between a bottom dead center position and a top dead center position. Sensing pressures within combustion cylinders for the purpose of controlling the timing of the engine is disclosed, e.g., in U.S. Pat. No. 4,063,538 (Powell et al.), U.S. Pat. No. 4,736,724 (Hamburg et al.); U.S. Pat. No. 5,276,625 (Nakaniwa); and U.S. Pat. No. 5,359,833 (Baldwin et al.). Examples of pressure sensors which withstand the harsh operating environment in a combustion cylinder are disclosed in U.S. Pat. No. 5,714,680 (Taylor et al.); U.S Pat. No. 5,452,087 (Taylor et al.); and U.S. Pat. No. 5,168,854 (Hashimoto et al.).

It is also known to utilize a pressure sensor within a combustion cylinder for the purpose of reducing engine detonation or knocking. Detonation occurs when an exothermic chemical reaction propagates with such a high speed that the rate of advance of the reaction zone into the unreacted fuel and air mixture exceeds the velocity of sound in the fuel and air mixture; that is, the advancing reaction zone is preceded by a shock wave. Pressure sensor signals are analyzed to determine whether high frequency variations in the cylinder pressure due to engine detonation are occurring. If detonation is occurring, the spark advance in the spark ignition engine is adjusted to assure that peak cylinder pressure occurs at the optimum crank angle consistent with desired reduction in engine detonation. An example of utilizing pressure sensor signals in a combustion cylinder for the purpose of reducing engine knock is disclosed in U.S. Pat. No. 4,620,438 (Howng).

A problem with a method as described in the Howng '438 patent as described above is that only the occurrence of detonation is detected using the pressure sensors. If any detonation is detected, the spark advance of the engine is adjusted. However, not all detonation is deleterious to efficient operation of the internal combustion engine. Thus, by adjusting operation of the internal combustion engine upon occurrence of any detonation, unnecessary and therefore inefficient adjustments of the internal combustion engine are effected.

The present invention is directed to overcoming one or more of the problems as set forth above.

SUMMARY OF THE INVENTION

In one aspect of the invention, a method of controlling detonation in an internal combustion engine is provided with the steps of: combusting a fuel and air mixture within a combustion cylinder; sensing a plurality of pressures at discrete points in time within the combustion cylinder; determining a pressure profile of the plurality of pressures; detecting detonation within the combustion cylinder; and acting upon the detonation, dependent upon where the detonation occurs on the pressure profile.

BRIEF DESCRIPTION OF THE DRAWINGS

FIG. 1 is a schematic illustration of an embodiment of a spark ignition combustion engine in which a method of controlling detonation of the present invention may be carried out;

FIG. 2 is a schematic illustration of a combustion cylinder in which detonation is beginning to occur;

FIG. 3 is a graphical illustration of an occurrence of detonation with respect to a pressure profile curve of a combustion cylinder within the compression combustion engine; and FIG. 4 is a block diagram of one embodiment of a method of the present invention which may be utilized with the spark ignition combustion engine of FIG. 1.

DETAILED DESCRIPTION

Referring now to the drawings, and more particularly to FIG. 1, there is shown a schematic view of an embodiment of a spark ignition combustion engine 10 which may be used to carry out a method of the present invention for controlling detonation therein. Spark ignition combustion engine 10 generally includes an Electronic Control Module (ECM) 12, an Electronic Control Module (ECM) 14 and sensors 16, 18, 20 and 22.

ECM 12 is a conventional ECM found onboard a vehicle, such as an on-road vehicle, off-road vehicle, etc. ECM 12 includes suitable input/output (IO) circuitry allowing ECM 12 to communicate either unidirectionally and/or bi-directionally with sensors 16, 18 and 20, and ECM 14, as indicated by lines 24, 26, 28 and 30, respectively. In the embodiment shown, lines 24, 26 and 28 transmit data in a unidirectional manner from sensors 16, 18 and 20 to ECM 12. Lines 30 communicate data in a bi-directional manner with ECM 14, as indicated by SYNC line 30 to ECM 14 and detonation detect line 30 to ECM 12. OF course, depending upon the communication scheme employed, lines 30 may be within a common cable, or may in fact be a single line over which data is transmitted using proper polling, interrupts, etc. Output line 32 is used to effect an action from ECM 12, depending upon the value of the sensed signals. For example, output line 32 may be used to adjust a timing of the combustion within a combustion cylinder 34 (FIG. 2), as indicated.

Sensor 16 is used to sense a manifold air pressure within spark ignition combustion engine 10 and provides a plurality of discrete signals to ECM 12 corresponding to the sensed manifold air pressures.

Sensor 18 is used to sense a manifold air temperature and provides a plurality of signals to ECM 12 via line 26. Sensing manifold air pressure and manifold air temperature is optional in the embodiment shown, as indicated. Sensor 20 is used to sense an engine speed and/or engine coolant temperature and provides a plurality of signals via line 28 to ECM 12. ECM 12 may analyze the values of the signals sensed by sensors 16, 18 and 20 or may pass the data to ECM 14 via SYNC line 30.

ECM 14 is used to detect the occurrence of detonation within spark ignition combustion engine 10, and communicates in a bidirectional manner with ECM 12 via lines 30. In the embodiment shown, ECM 14 is a separate ECM which is coupled with ECM 12 via lines 30. However, it is also to be understood that ECM 14 and ECM 12 may be combined into a common ECM, depending upon the particular application.

Pressure sensors $22_1$–$22_n$ sense pressures within respective combustion cylinders 34 of spark ignition combustion engine 10. The number "n" of pressure sensors 22 corresponds to the number of combustion cylinders within spark ignition combustion engine 10. Sensors $22_1$–$22_n$ sense a plurality of pressures at discrete points in time within corresponding combustion cylinders 34 and provide a plurality of pressure signals to ECM 14 via lines 36. In the embodiment shown, lines 36 are assumed to be bus lines such that a common bus is used to communicate with ECM 14. However, it is to be understood that each pressure sensor $22^1$–$22^n$ may include a direct connection with ECM 14, depending upon the 10 configuration of ECM 14.

As shown in FIG. 2, each of the plurality of combustion cylinders 34 includes a piston 38 which is slidably disposed therein. Piston 38 may include a contoured crown, as shown, which affects the fluid dynamics of the fuel and air mixture in combustion chamber 40 within combustion cylinder 34. A spark plug 42 ignites the fuel and air mixture in combustion chamber 40 at selected points in time as piston 38 moves between a top dead center position and a bottom dead center position. The combustion propagation proceeds in multiple directions, as indicated by direction arrows 44. Pressure sensor 22 is in fluid communication with combustion chamber 40 and senses a plurality of pressures at discrete points of time. Pressure sensor 22 may be positioned at the axial end of combustion cylinder 34 as shown, or may be positioned at some other desired location (such as a sidewall of combustion cylinder 34), depending upon the particular application.

As shown in FIG. 2, it is possible that not all of the fuel and air mixture combusts during the primary exothermic chemical reaction within combustion chamber 40. Some of the non-combusted, fuel which remains within combustion chamber 40 typically may be located in areas within combustion chamber 40 away from spark plug 42, as illustrated by fuel and air mixture pocket 46. It is possible for this fuel and air pocket to combust separately from the primary charge of fuel and air which is injected into combustion chamber 40, thereby causing detonation with an additional shock wave to occur within combustion chamber 40.

Referring to FIG. 3, a pressure profile curve is shown with the piston position being represented on the horizontal axis and the pressure within the combustion chamber being represented on the vertical axis. During normal operation (indicated by the dashed line), the pressure within the combustion cylinder reaches a maximum near or shortly after a top dead center position of the piston 38 within combustion cylinder 34. Typically, detonation does not occur during normal operation.

It is also possible for the peak pressure to be magnified at a point in time which is delayed relative to the top dead center position of piston 38. Detonation of fuel and air pocket 46 within combustion chamber 40 may occur along the pressure profile curve at a point in time after the peak pressure, which is referred to as "auto ignition of detonation" in FIG. 3. This type of detonation is evidenced by higher frequency vibrations of the pressure changing from a plus to a minus value as the pressure fluctuates. This type of detonation occurring after the peak pressure has been found not to be particularly deleterious to operation of compression combustion engine 10.

On the other hand, detonation of fuel and air pocket 46 which occurs before the peak pressure, referred to as "hard detonation", has been found to be deleterious to operation of compression combustion engine 10. If hard detonation is sensed, it is possible to take various actions which either eliminate the detonation or move the detonation to a point in time after occurrence of the peak pressure such that the detonation is not harmful. For example, it is possible to adjust the timing of the ignition; reduce an amount of fuel which is injected, and/or reduce a load on spark ignition combustion engine 10 to affect the location of the detonation on the pressure profile curve shown in FIG. 3.

INDUSTRIAL APPLICABILITY

During use, and referring now to FIG. 4, an embodiment of the method of the present invention for inhibiting detonation in a spark ignition combustion engine 10 will be more specifically described. FIG. 4 is a block diagram of one embodiment of the method of the present invention for inhibiting detonation.

Pressure signals from pressure sensors $22_1$–$22_n$ are inputted to block 48 via line 50. Additionally, timing signals corresponding to the position of a crankshaft, and thus the position of the pistons within the respective cylinders, may be inputted to block 48 via line 52. Also, manifold air pressure, manifold air temperature, engine speed and engine coolant temperature may optionally be inputted to block 48. At block 48, the various inputted signals are analyzed to determine whether detonation is occurring. Preferably, the signal analysis may be performed on four different bases. First, the frequency of the pressure signals for a given combustion cylinder may be analyzed. High frequency pressure fluctuations indicate that detonation is occurring. By superimposing the high frequency pressure fluctuations over a pressure profile determined by timing signals inputted at line 52, the relative position of the detonation on the pressure profile may be determined (e.g., by using numerical analysis techniques, look-up tables, etc.).

Alternatively, a change in the pressure signals with respect to time may be analyzed at block 48 using ECM 14. Changes in pressure (above expected noise levels) over a predetermined short period of time may be used to indicate that detonation is occurring.

Additionally, changes in the mathematical sign of the pressure change over time may be used to indicate that detonation is occurring. Referring to FIG. 3 and the dashed line corresponding to normal pressure changes, it may be observed that although a slight dip in the pressure occurs at a location approximately 10° after top dead center, the pressure continuously decreases thereafter. On the other hand, the overlaid solid trace corresponding to auto ignition of detonation evidences that the pressure fluctuates, with each fluctuation having both a positive as well as negative mathematical component change. The change in mathematical sign of the pressure change over time can thus be used to determine that detonation is occurring. By overlaying the detonation with respect to the pressure profile curve of FIG. 3, it may be determined whether deleterious hard detonation is occurring.

Finally, the heat release rate, as extracted from cylinder pressure data, may reveal when detonation is iminant.

At block 54, a determination that detonation has occurred takes place. Of course, the determination of an occurrence of detonation may also likewise take place within ECM 14 (i.e., combined with block 48) based upon the analysis of the input signals at block 48.

After determining that detonation has occurred, no action or various actions may take place (block 56). For example, to inhibit the detonation or to move the detonation to an area on the pressure profile curve which is non-deleterious, the timing of spark ignition combustion engine 10 may be adjusted (block 58). Alternatively, the timing as well as the occurrence of the detonation may be communicated to another processing circuit, or may be communicated visually via a display screen or the like to a user (block 60). It is also possible to communicate only the occurrence of the detonation if the timing of spark ignition combustion engine 10 is not of primary concern (block 62). Additionally, it is possible to reduce the amount of fuel which is injected into combustion chamber 40 using fuel injector 42 to inhibit or move the detonation to a different location on the pressure profile curve (block 64). Furthermore, it is also possible to reduce the load which is applied to spark ignition combustion engine 10 to reduce detonation (block 66).

The various actions indicated in block 56 are intended to be exemplary only. It is also possible that other actions may be taken to inhibit detonation and/or move the relative location of the detonation on the pressure profile curve of the corresponding combustion cylinder.

The method of the present invention controls detonation in a spark ignition combustion engine by detecting an occurrence of detonation within one or more combustion cylinders and acting upon the occurrence of detonation dependent upon the relative position of the detonation on a pressure profile curve of a corresponding combustion cylinder. The occurrence of detonation may be analyzed using the frequency of the pressure signals, the change in pressure over time, or a change in mathematical sign of the pressure over time. If the detonation is occurring in a non-deleterious portion of the pressure profile curve, it may not be necessary to take action for control of the compression combustion engine. On the other hand, if the detonation is occurring in an area of the pressure profile curve where hard detonation occurs, positive action may be taken to inhibit detonation or adjust the position of the detonation on the pressure profile curve.

Other aspects, objects and advantages of this invention can be obtained from a study of the drawings, the disclosure and the appended claims.

What is claimed is:

1. A method of controlling detonation in an internal combustion engine, comprising the steps of:
    combusting a fuel and air mixture within a combustion cylinder;
    determining a peak pressure of the combustion within said combustion cylinder;
    detecting detonation within said combustion cylinder; and
    acting upon said detonation, dependent upon whether said detonation occurs after or before said peak pressure.

2. The method of claim 1, including the step of determining a top dead center position of a piston within said combustion cylinder, said acting step being carried out dependent also upon whether said detonation occurs after or before said top dead center position.

3. The method of claim 1, including the step of determining a top dead center position of a piston within said combustion cylinder, said peak pressure occurring at approximately 10 degrees after said top dead center position.

4. The method of claim 1, wherein said acting step comprises at least one of:
    adjusting a timing of the ignition;
    communicating each of timing and detonation;
    communicating only detonation,
    reducing an amount of fuel to said combustion cylinder; and
    reducing a load on said compression combustion engine.

5. The method of claim 4, said adjusting substep including advancing said timing of the fuel and air mixture.

6. The method of claim 5, said adjusting substep including advancing said timing of the fuel and air mixture such that said detonation occurs after said peak pressure.

7. The method of claim 1, said detonation occurring after said peak pressure corresponding to auto ignition of detonation, and said detonation occurring before said peak pressure corresponding to hard detonation.

8. The method of claim 1, said detecting step comprising:
    sensing a plurality of pressures at discrete points in time within said combustion cylinder; and
    at least one of:
        analyzing a frequency of said pressures;
        analyzing a quotient of a change in said pressures divided by a change in time;
        analyzing a sign change of a quotient of a change in said pressures divided by a change in time; and
        analyzing a heat release rate.

9. A method of controlling detonation in an internal combustion engine, comprising the steps of:
    combusting a fuel and air mixture within a combustion cylinder;
    sensing a plurality of pressures at discrete points in time within said combustion cylinder;
    determining a pressure profile of said plurality of pressures;
    detecting detonation within said combustion cylinder; and
    acting upon said detonation, dependent upon where said detonation occurs on said pressure profile.

10. The method of claim 9, including the step of determining a peak pressure of the combustion within said combustion cylinder, said acting step including acting upon said detonation dependent upon whether said detonation occurs after or before said peak pressure.

11. The method of claim 9, wherein said acting step comprises at least one of:
    adjusting a timing of the ignition;
    communicating each of timing and detonation;
    communicating only detonation;
    reducing an amount of fuel to said combustion cylinder; and
    reducing a load on said compression combustion engine.

12. The method of claim 11, said adjusting substep including advancing said timing of the fuel and air mixture.

13. The method of claim 12, said adjusting substep including advancing said timing of the fuel and air mixture such that said detonation occurs after said peak pressure.

14. The method of claim 9, said detonation occurring after said peak pressure corresponding to auto ignition of detonation, and said detonation occurring before said peak pressure corresponding to hard detonation.

* * * * *